United States Patent
Miller

(10) Patent No.: US 11,635,171 B2
(45) Date of Patent: Apr. 25, 2023

(54) FLUID CRYOGEN INJECTOR MOUNTING APPARATUS AND MOUNTING METHOD

(71) Applicant: Messer Industries USA, Inc., Bridgewater, NJ (US)

(72) Inventor: Weston L. Miller, Boyertown, PA (US)

(73) Assignee: Messer Industries USA, Inc., Wilmington, DE (US)

( * ) Notice: Subject to any disclaimer, the term of this patent is extended or adjusted under 35 U.S.C. 154(b) by 344 days.

(21) Appl. No.: 17/161,719

(22) Filed: Jan. 29, 2021

(65) Prior Publication Data
US 2021/0247028 A1 Aug. 12, 2021

Related U.S. Application Data

(60) Provisional application No. 62/972,292, filed on Feb. 10, 2020.

(51) Int. Cl.
| F17C 13/08 | (2006.01) |
| B05B 15/65 | (2018.01) |
| A23L 3/375 | (2006.01) |

(52) U.S. Cl.
CPC .............. *F17C 13/08* (2013.01); *A23L 3/375* (2013.01); *B05B 15/65* (2018.02); *A23V 2002/00* (2013.01); *F17C 2205/0394* (2013.01); *F17C 2221/014* (2013.01); *F17C 2223/0161* (2013.01); *F17C 2270/05* (2013.01)

(58) Field of Classification Search
CPC .............. F17C 13/08; F17C 2205/0394; F17C 2221/014; F17C 2223/0161; F17C 2270/05; A23L 3/375; B05B 15/65; A23V 2002/00
See application file for complete search history.

(56) References Cited

U.S. PATENT DOCUMENTS

| 2,700,454 | A | * | 1/1955 | Blattner | ................... B61F 5/18 |
| | | | | | 105/200 |
| 5,018,358 | A | * | 5/1991 | Lee | ........................ F17C 9/00 |
| | | | | | 62/48.1 |
| 2012/0255315 | A1* | | 10/2012 | Cousin | ..................... F25D 3/10 |
| | | | | | 62/64 |
| 2017/0119014 | A1* | | 5/2017 | Newman | ................ A23L 3/375 |
| 2017/0119213 | A1* | | 5/2017 | Newman | ................ A47J 43/07 |
| 2018/0236397 | A1* | | 8/2018 | Baxter | ..................... B04C 5/08 |
| 2018/0236460 | A1* | | 8/2018 | Baxter | ................... C10L 3/101 |

FOREIGN PATENT DOCUMENTS

EP 2700454 A1 * 2/2014 ............ B01F 15/063

* cited by examiner

*Primary Examiner* — Emmanuel E Duke
(74) *Attorney, Agent, or Firm* — Joshua L. Cohen

(57) ABSTRACT

An apparatus for mounting a fluid cryogen injection nozzle to the exterior surface of a side wall of a cryogenic process vessel for permitting injection of a fluid cryogen into the interior of the cryogenic process vessel, the mounting apparatus including a base member and a rotatable insert member engaged with the base member, the rotatable insert member including a template for creating an opening in the side wall of the process vessel that is configured to accept the cryogen injection nozzle, and for attaching mechanical fasteners to the side wall of the process vessel in a defined pattern, such as a concentric pattern about the opening in the side wall of the cryogenic process vessel. A related mounting method is also provided.

22 Claims, 5 Drawing Sheets

FLUID CRYOGEN INJECTOR MOUNTING APPARATUS AND MOUNTING METHOD

TECHNICAL FIELD

The present disclosure relates to an apparatus and method for mounting a fluid injector to a wall of a material process vessel. The present disclosure more particularly relates to an apparatus and method for mounting a cryogen injector to an exterior surface of a wall of a cryogenic process vessel for cryogenically processing or treating a material.

BACKGROUND

Cryogenic processing and treatment vessels such as cryogenic blenders, mixers, tumblers, kettles, chillers, coolers and freezers are used to cryogenically process a wide variety of materials and products, especially in the food and beverage industry. Cryogenic fluids or substances are delivered to the cryogenic processing vessels by cryogen injection nozzles mounted on the exterior wall surface of the vessel and which are in fluid communication with the interior of the vessel to process or treat the materials or products located within the interior of the vessel.

Cryogenic processing vessels, such as, for example, cryogenic blenders, mixers and kettles may include curved exterior side walls. The cryogenic injection nozzles are typically mounted on these curved side walls near the bottom of the cryogenic processing vessel to provide fluid cryogen near the bottom of the interior of the blending or mixing vessel.

Known methods of mounting cryogen injection nozzles to the exterior surface of a side wall of a cryogenic blender or mixer take hours to mount a single cryogen injection unit to a side wall of the blending or mixing vessel of the cryogenic blender or mixer. Typical cryogen blenders or mixers require from 4 to 16 separate cryogen injection nozzles to be mounted to the exterior surface of the side wall of the blending or mixing vessel. Whether a new installation or a retrofit, it generally takes a number of days to mount the required number of cryogen injection nozzles on a given cryogenic blender or mixer apparatus.

To minimize process downtime during either a new installation or a retrofit application, the owner of the cryogenic processing equipment typically allots only a single day or a weekend in which to mount the cryogen injection nozzles to the cryogenic blender or mixer. The time constraints placed on the installers and service technicians increases the risk for misalignment and inaccurate mounting of the cryogen injectors on the cryogenic blenders and mixers. The potential for misalignment may result in serious health and safety issues. For example, misalignment of the cryogen injection nozzle may prevent a proper seal between the injection nozzle and the side wall of the processing vessel. This misalignment can result in excessive bacterial growth on the exterior of the processing vessel wall in the vicinity of the cryogen injection nozzle.

What is therefore needed in the food and beverage industry for example is an apparatus and mounting method that reduces the time required for mounting cryogen injection nozzles to the exterior surface of the side walls of cryogenic processing vessels, and which provides accurate and precise alignment and positive seal between the cryogen injection nozzle and the wall of the cryogen vessel.

SUMMARY

According to certain illustrative embodiments disclosed herein, there is provided an apparatus for mounting a cryogen injection nozzle to a side wall of a cryogenic processing vessel, the apparatus comprising a base member having opposite facing first and second base member sides and a base member opening extending through the base member; and an insert member rotatably positioned within the opening of the base member, the insert member comprising first and second insert member sides, a first insert opening extending through the insert member, and a plurality of second insert openings positioned around the first insert opening and extending through the insert member.

According to further illustrative embodiments herein, also disclosed is a method for mounting a cryogen injection nozzle to the side wall of a cryogenic processing vessel comprising (a) removably attaching an apparatus for mounting the cryogen injection nozzle to the side wall of the vessel, the apparatus comprising (i) a base member having opposite facing first and second base member sides and a base member opening extending through the base member, and (ii) an insert member rotatably positioned within the opening of the base member, the insert member comprising first and second insert member sides, a first insert opening extending through the insert member, and a plurality of second insert openings positioned around the first insert opening and extending through the insert member; (b) creating an opening in the side wall of the vessel by passing an opening-forming means through the first insert opening of the insert member of the apparatus and the side wall of the cryogenic processing vessel; (c) attaching mechanical fasteners to the exterior surface of the side wall of the cryogen processing vessel in a pattern around the opening formed in the side wall by passing a mechanical fastener through each of the second insert openings of the insert member of the mounting apparatus; (d) removing the mounting apparatus from the side wall of the cryogenic processing vessel; and (e) attaching the cryogen injection nozzle to the exterior surface of the side wall of the cryogenic processing vessel.

BRIEF DESCRIPTION OF DRAWINGS

The accompanying illustrative drawings are included to provide a further understanding of the apparatus and method disclosed herein, and are incorporated in and constitute a part of this specification. The drawings illustrate certain embodiments of the apparatus and method disclosed herein and, together with the description, serve to explain the principles described herein, but are not intended to limit the specification or any of the claims in any manner.

DETAILED DESCRIPTION

Figure 1:
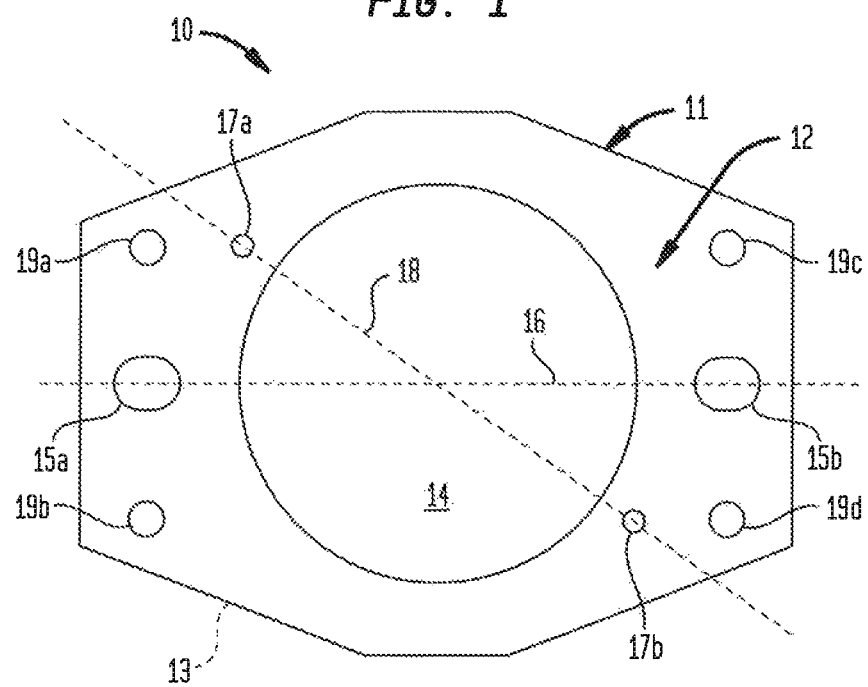
FIG. 1 is a top plan view of an illustrative embodiment of the base member of the cryogen injector mounting apparatus.

The present disclosure is directed to an apparatus for mounting a cryogen injection apparatus for injecting a cryogenic substance, such as a cryogenic gas or cryogenic liquid, into the interior of a cryogenic processing vessel. The mounting apparatus may be used to mount a cryogen injection nozzle to the exterior surface of a side wall of a cryogenic processing vessel to enable the injection nozzle to inject a cryogenic gas or liquid into the interior of the vessel.

The apparatus for mounting a cryogen injection nozzle to a side wall of a cryogenic processing vessel includes a base member and an insert member that is movably engaged with the base member. The base member of the mounting apparatus includes opposite facing first and second base member sides or surfaces, and an opening that extends or passes through the entire thickness or body portion of the base member. The insert member is rotatably positioned within the opening of the base member of the apparatus. The insert member includes first and second insert member sides or surfaces, a first insert opening extends or passes through the entire thickness of the insert member, and a plurality of second insert member openings that are positioned about the first insert opening of the insert member and which extend or pass through the entire thickness of the insert member of the apparatus. The insert member is capable of rotating 360° C. in either direction within the opening of the base member of the apparatus.

The plurality of second insert member openings may be positioned about the first insert opening of the insert member in a variety of patterns. For example, and without limitation, the plurality of second insert openings may be positioned about the first insert opening in a concentric, triangular, square, pentagon, or octagon pattern. According to certain illustrative embodiments, and without limitation, the plurality of second insert member openings are positioned about the first insert opening of the insert member in a concentric pattern, and each second opening extends or passes through the entire thickness of the insert member of the apparatus.

According to certain embodiments, the base member of the mounting apparatus is substantially planar or completely planar. According to certain illustrative embodiments, the shape of the base member of the mounting apparatus is an octagon. It should be noted however that the octagonal shape of illustrative embodiments is not limiting of the shape of the base member. The base member may be configured in any shape so long as the base member is capable of engaging and supporting the insert member and any additional structure(s) needed to removably affix the mounting apparatus to the external surface of the side wall of a cryogenic processing or product treatment vessel during installation or mounting of the fluid cryogen injector. By "configured" it is also meant herein that such is "constructed and arranged."

The base member further includes a pair of openings that extend through the entire thickness of the base member and which are configured to receive a mechanical fastener for removably and temporarily attaching the mounting apparatus to the exterior side wall of a cryogenic processing vessel for the purpose of mounting a fluid cryogen injector. The pair of openings are positioned on opposite ends of the base member and are aligned along an axis that bisects the base member opening. According to certain embodiments, the base member may include more than one pair of openings configured to accept mechanical fasteners for attaching the mounting apparatus to the side wall.

The insert member of the injector mounting apparatus is configured to be rotatably engaged with the base member of the apparatus. According to certain embodiments, the insert member of the apparatus includes a lower portion and upper portion. The lower portion of the insert member comprises a substantially cylindrically shaped body having a first outer diameter. The upper portion of the insert member comprises a lip portion extending outwardly and radially from the top of the lower portion of the insert member. The upper lip portion of the insert member includes an outer diameter that is greater than the outer diameter of the lower portion of the insert member of the apparatus. Thus, the insert member has a lower portion with a first outer diameter and an upper lip portion with a second outer diameter, wherein the second outer diameter is greater than the first outer diameter.

The upper lip portion of the insert member extends substantially horizontally from the top end of the lower portion of the insert member. The upper lip portion includes opposite facing first and second lip portion sides or surfaces. The second lip portion surface is in immediate adjacent contact with the first side of the base member of the mounting apparatus. In this manner, the second lip portion surface rests or otherwise sits on the first surface of the base member, and the lower portion of the insert member extends into the first base member opening of the apparatus.

The insert member provides a pattern or template for creating an opening in the side wall of the cryogenic processing vessel that is configured to accept a portion of the cryogen fluid injection nozzle, and for accurately and precisely attaching mechanical fasteners to the exterior surface of the vessel side wall in a defined or select pattern around an opening formed in the side wall. According to certain embodiments, the insert member includes a first insert opening extending through the insert member that is configured to accept an opening-forming means, such as a drill bit, for forming an opening in the side wall of the cryogenic processing vessel, and a plurality of second insert openings that are positioned, for example, concentrically around the first insert opening and extending through the insert member. The plurality of second insert openings are positioned at defined locations relative to the first insert opening and are configured to accept mechanical fasteners to be attached to the side wall of the cryogenic processing vessel in a defined or select pattern about the side wall opening.

According to certain embodiments, the insert member includes a first insert member opening that is positioned substantially centrally on the insert member and six second insert member openings positioned concentrically about the first insert member opening.

According to other embodiments, the insert member includes a first insert member opening that is positioned substantially centrally on the insert member and six second insert member openings equidistantly spaced from each other in a concentric pattern around the first insert member opening and where the center of each of the six second insert member openings is equidistant from the center of the first insert member opening.

According to further embodiments, the mounting apparatus includes a drill bushing that is at least partially inserted into the first insert opening of the insert member. The inner diameter of the drill bushing is configured to accept a suitable drill bit for drilling an opening in the side wall of the cryogenic processing vessel. According to certain embodiments, and without limitation, the inner diameter of the drill bushing is about 12 mm.

The insert member is freely rotatable 360° C. in both directions relative to the base member of the mounting apparatus. The apparatus may include means for constraining the rotation of the insert member within the opening of the base member. According to certain embodiments, the means for constraining the rotation of the insert member within the opening of the base member comprises at least one mechanical fastener that is mounted on the first side of the base member. The means for constraining the rotation of the insert member within the opening of the base member may include two mechanical fasteners that are mounted on the first side of the base member along an imaginary axis that bisects the insert member.

The mounting apparatus, in further embodiments, includes at least one jacking bolt or jacking screw that is in threaded engagement with the base member of the mounting apparatus. According to certain embodiments, the mounting apparatus includes a plurality of jacking bolts or jacking screws that are in threaded engagement with the base member of the mounting apparatus. In yet further embodiments, the mounting apparatus includes a pair of spaced-apart jacking bolts or jacking screws. The pairs of spaced-apart jacking bolts or jacking screws are in threaded engagement with the base member of the apparatus, and are positioned along imaginary axes near opposite sides of the base member. The pairs of jacking bolts or jacking screws are positioned substantially perpendicular to the exterior surface of the side wall of the cryogenic processing vessel and are used for adjusting the position of the mounting apparatus on curved side wall surfaces.

The cryogen injector nozzle mounting apparatus is fully indexable, wherein the apparatus can be oriented in any direction on the exterior surface of a side wall of a cryogen processing vessel. The mounting apparatus can be removably attached or engaged with the exterior surface of the side wall of the processing vessel in any location and in any position.

Also disclosed is a method for mounting a cryogen injection nozzle to the side wall of a cryogen processing vessel with the mounting apparatus. The mounting method includes removably attaching the mounting apparatus disclosed herein to the side wall of a cryogenic processing chamber or vessel. The mounting apparatus is removably attached to the side wall of the vessel by passing threaded fasteners though suitably configured openings formed in the base member of the mounting apparatus. According to certain embodiments, and without limitation, the threaded fasteners are passed through the opening formed in the base member of the mounting apparatus and are attached to the exterior surface of the cryogen processing vessel by a contact arc weld. It should be noted that the attachment of the threaded fasteners to the vessel side wall is not limited to a contact arc weld, and any suitable method of attaching the fastener to the vessel side wall may be used. Nuts are threaded over the threaded fasteners to removably secure the mounting apparatus to the vessel side wall.

The threaded jacking bolts threadingly engaged with the base member of the mounting apparatus are turned or rotated until ends of the jacking bolts come into contact with the exterior surface of the side wall of the vessel in a perpendicular arrangement relative to the points of contact between the jacking bolts and the exterior surface of the vessel side wall.

After the mounting apparatus has been removably secured to the exterior surface of the vessel side wall by the mechanical fasteners and the position aligned by the jacking bolts, a suitable drill bushing may be engaged with the first insert member opening of the insert member of the mounting apparatus. A drill bit is inserted into the drill bushing and a drill is operated to create or otherwise form an opening in the side wall of the vessel that is aligned or in registration with the first insert member opening.

Mechanical fasteners are attached to the exterior surface of the side wall of the vessel in a concentric pattern, according to certain embodiments, about the opening formed in the side wall by passing a mechanical fastener through each of the second insert openings of the insert member of the mounting apparatus and attaching the mechanical fasteners to the side wall by a contact arc weld. The mechanical fasteners do not penetrate the side wall of the cryogenic processing vessel. It should be noted that the attachment of the mechanical fasteners to the vessel side wall is not limited to a contact arc weld, and any suitable method of attaching the fasteners to the vessel side wall may be used.

According to certain embodiments, after the mechanical fasteners have been attached to the side wall of the cryogenic processing vessel in a concentric pattern about the central nozzle opening formed by the drilling operation, the mounting apparatus is removed from the side wall of the vessel by unbolting the sacrificial mechanical fasteners. The sacrificial mechanical fasteners may be mechanically ground down, cut or broken off near the side wall surface so as not to interfere with the attachment of the cryogen injection apparatus or nozzle at the exterior side wall surface. By "sacrificial" it is meant herein that the mechanical fasteners will eventually be destroyed or given up so that there is no interference with the apparatus or the nozzle.

The cryogen injector nozzle is attached to the exterior surface of the side wall of the processing vessel by positioning openings in the cryogen injector apparatus over the threaded fasteners attached to the side wall of the vessel in a concentric pattern, according to certain embodiments, about the central opening created in the side wall by the drilling operation. The cryogen injection nozzle apparatus is moved into closer position to the exterior surface of the vessel side wall by passing the concentrically attached mechanical fasteners through the corresponding openings on the injector apparatus. The cryogen injection nozzle is inserted into the opening in the side wall surrounded by the concentric pattern of attached fasteners. The injector nozzle apparatus is then bolted down to the exterior surface of the vessel by fastening nuts over the six threaded studs.

After the cryogen injector nozzle is attached to the side wall of the vessel with the cryogen nozzle outlet in fluid communication with the interior of the process vessel, the cryogen inlet end of the cryogen injection nozzle is connected with a source of fluid cryogen intended to be injected into the interior of the vessel. According to certain embodiments, the cryogen injection nozzle is attached to a source of liquid nitrogen. According to certain embodiments, the cryogen injection nozzle is attached to a source of liquid carbon dioxide.

Without limitation, and only by way of illustration, the mounting apparatus and mounting method may be used to mount a cryogen injection nozzle to the exterior surface of a side wall of cryogenic blenders, cryogenic tumblers, cryogenic mixers, cryogenic kettles, cryogenic chillers, cryogenic coolers, cryogenic freezers and other cryogenic processing vessels that are used to cryogenically process product.

According to certain illustrative embodiments, the mounting apparatus and mounting method may be used to mount a cryogen injection nozzle to the exterior surface of a side wall of cryogenic blenders, cryogenic tumblers, cryogenic mixers and cryogenic kettles to cryogenically process food and beverage product in the food and beverage industry.

According to certain illustrative embodiments, the cryogenic fluid injection nozzle may comprise an injection nozzle that is configured to inject a defined amount of cryogen near the bottom of the cryogen processing vessel. These cryogenic processing vessels are referred to as bottom injection cooling or chilling apparatus.

The cryogenic fluid injection nozzle may comprise an injection nozzle that is configured to inject a defined or a select amount of cryogen directly into the product mass within the cryogen processing vessel. The cryogenic fluid evaporates or sublimes in contact with the product mass, absorbing heat from it, and the cold cryogenic gas continues to cool the product as it moves through the cryogenic process vessel.

The cryogenic processing apparatus or system includes a cryogenic material processing chamber, container or vessel, a plurality of cryogen injection nozzles, storage container or storage vessel for storing a source of cryogen to be delivered to the cryogen processing vessel, suitable hosing or tubing for connecting the cryogen injection nozzles to the source of cryogen fluid, and a controller for controlling the system and cryogenic cooling process.

Cryogenic fluids are cooling or chilling fluids that are liquids at or below a temperature of about −150° C. Suitable cryogenic fluids that may be delivered to the cryogenic treatment vessel by the cryogen injection nozzle include, for example, but are not limited to liquid argon, liquid carbon dioxide, liquid helium, liquid nitrogen, and the like. According to certain embodiments, the cryogenic fluid is liquid nitrogen. According to other embodiments, the cryogenic fluid is liquid carbon dioxide. The cryogenic cooling or chilling of the material within the cryogen treatment vessel with the cryogenic fluid can be carried out at any cryogenic temperatures that are suitable to sufficiently chill or cool the material for subsequent processing. By way of illustration, not limitation, the cryogenic cooling or chilling of the material located within the cryogenic treatment vessel with the cryogenic fluid can be carried out at temperatures at or below −150° C., at or below −160° C., at or below −170° C., at or below −180° C., at or below −190° C., at or below −200° C., or at lower temperatures.

The mounting apparatus and mounting method may be used to mount one or more cryogen injection nozzles to the exterior side wall of a cryogen processing vessel for processing product in the food and beverage industry. Without limitation and only by way of illustration, the cryogenic processing vessel may be used to cryogenically process baby food, dairy products, dry foods, bakery products, fish, seafood, fruits, vegetables, meats, meat analogues, meat alternatives, fake meats, faux meats, imitation meats, mock meats, meat substitutes, vegetarian meats, vegan meats, pastes, pulp products, purees, sauces, soups, and like food and beverage products.

Figure 4:
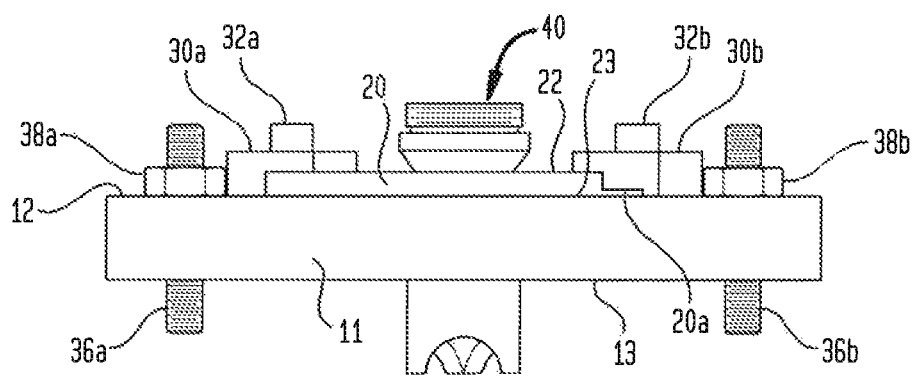
FIG. 4 is a side view of the illustrative embodiment of the cryogen injector mounting apparatus of FIG. 3.

Referring to FIG. 1, an injector nozzle of mounting apparatus 10 includes a base member 11 having a first major surface 12 and an opposite facing second major surface 13 (not shown in FIG. 1 due to the view perspective, but indicated with broken line to correspond to that which is shown in FIG. 4). In the illustrative embodiment shown in FIG. 1, base member 11 is provided in the shape of an octagon. Base member 11 includes an opening 14 that extends through the entire thickness or body portion of the base member 11 from first major surface 12 to the second major surface 13. Base member 11 also includes a pair of openings 15a, 15b that are located at opposite marginal ends of base member 11. As illustrated in FIG. 1, openings 15a, 15b are shown generally aligned along an axis 16 that bisects opening 14. Openings 15a, 15b extend through the entire thickness or body portion of the base member 11 from first major surface 12 to the second major surface 13. Openings 15a, 15b are configured to receive sacrificial elongated mechanical fasteners (not shown in FIG. 1) that extend through openings 15a, 15b. The mechanical fasteners are attached to the exterior surface of the cryogenic processing vessel to temporarily attach the mounting apparatus 10 to the exterior wall surface of the cryogenic processing vessel during and for the injector nozzle installation. Base member 10 further includes a pair of openings 17a, 17b which are shown generally aligned along an axis 18 that bisects opening 14. Openings 17a, 17b are configured to accept mechanical fasteners (not shown in FIG. 1) to secure the means for constraining the rotation (not shown in FIG. 1) of the insert member 20 (not shown in FIG. 1) to the first major surface 12 of base member 11. Base member 11 also includes a plurality of jacking bolt openings 19a-19d configured to receive elongated threaded jacking bolts.

Figure 2:
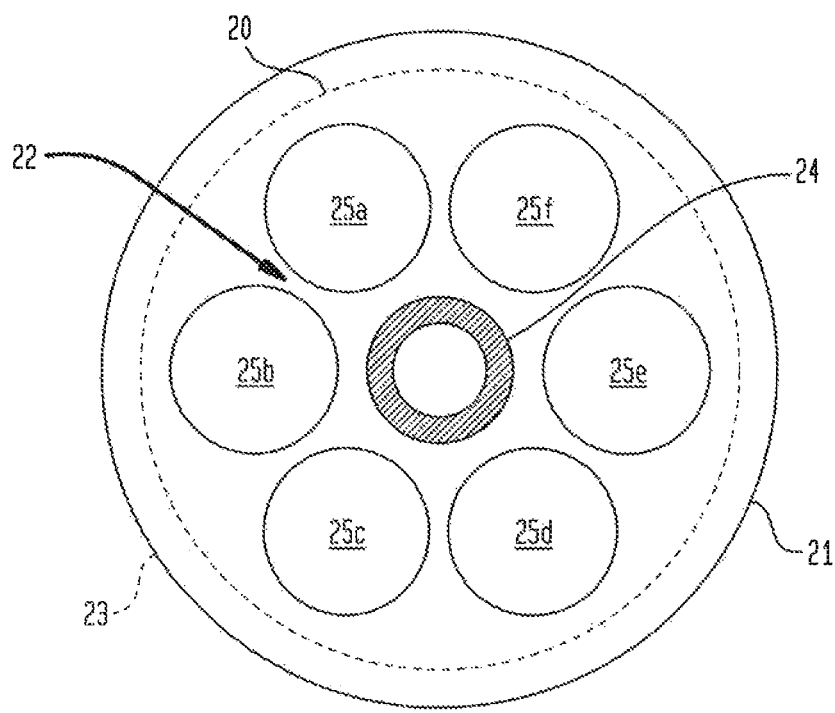
FIG. 2 is a top plan view of an illustrative embodiment of the rotatable sleeve of the cryogen injector mounting apparatus.

Referring to FIG. 2, the injector nozzle of mounting apparatus 10 includes an insert member 20 that is configured to be at least partially inserted into base member opening 14. In the illustrative embodiment shown in FIG. 2, insert member 20 is provided in the shape of a circle having an outer periphery 21. Insert member 20 includes a first major surface 22 and an opposite facing second major surface 23 (not shown in FIG. 2 due to the view perspective, but indicated with broken line to correspond to that which is shown in FIG. 4). Insert member 20 also includes a first insert member opening 24 that extends through the entire thickness or body portion of insert member 20 from the first major surface 22 to the second major surface. In the illustrative embodiment of FIG. 2, the first insert member opening 24 is shown as a circular opening that is substantially centrally positioned on the insert member 20. A plurality of second insert member openings 25a-25f (numbered counterclockwise for reference) are positioned about or otherwise surround first insert member opening 24. In the illustrative embodiment shown in FIG. 2, the plurality of second insert member openings are positioned about the first insert member opening 24 in a concentric pattern. It should be noted that the number and positioned of the second insert member openings 25a-25f are not limited to the number and positioning depicted in illustrative FIG. 2.

Figure 3:
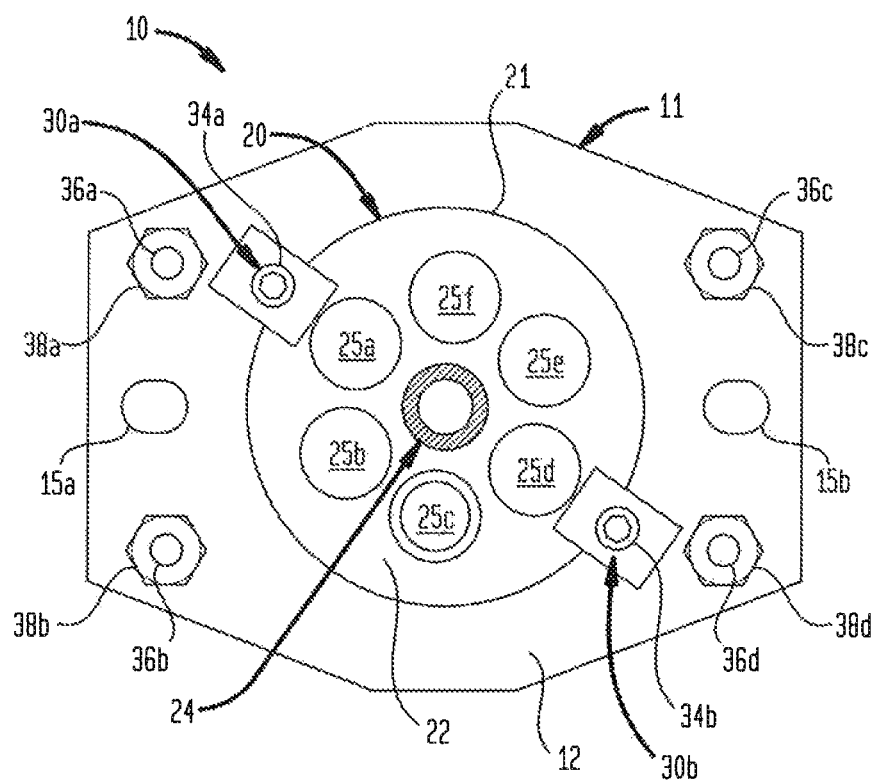
FIG. 3 is a top plan view of an illustrative embodiment of the cryogen injector mounting apparatus.

Referring to FIGS. 3 and 4, the injector nozzle of mounting apparatus 10 is shown having a base member 11 and insert member 20 in rotatable engagement with the base member 11. In the illustrative embodiment shown in FIG. 3, insert member 20 is inserted in base member opening 14 and is in rotatable engagement with the base member 11 of the mounting apparatus 10. Means 30a, 30b for constraining the rotation of insert member 20 relative to base member 11 are releasably engaged with the first major surface 22 of the insert member 20. Means for constraining 30a, 30b are secured to insert member 20 by threaded fasteners 32a, 32b and nuts 34a, 34b threading the fasteners 32a, 32b through openings 17a, 17b. Threaded jacking bolts 36a-36d are threaded through jacking bolt openings 19a-19d of base member 11 and secured with jacking bolt nuts 38a-38d.

Referring to FIG. 4, a side view of mounting apparatus 10 is shown. Base member 11 includes first major surface 12, the opposite facing second major surface 13, and a thickness or a body portion extending between the first 12 and second 13 opposite facing major surfaces. Insert member 20 includes an upper lip portion 20a that extends from and circumscribes an outer edge of the insert member and out of base member opening 14 in order to rest upon the first major surface 12 of base member 11. Threaded jacking bolts 36a, 36b are threaded through jacking bolt openings 19a, 19b (not shown in FIG. 4) of base member 11 and secured with jacking bolt nuts 38a, 38b. Insert member 20 is inserted into base member opening 14 (not shown in FIG. 4). The rotation of insert member 20 is restrained by securing rotatable insert member 20 in a desired position with the constraining means 30a, 30b which are engaged with base member 11 through openings 17a, 17b (not shown in FIG. 4), Base member opening 14 and first insert member opening 24 are aligned and in registration with each other. A drill bushing 40 is inserted into first insert member opening 24 and base member opening 14. The inner circumference of drill bushing 40 is configured to accept a drill bit to drill a hole of desired size through the exterior side wall (not shown) of a cryogenic treatment vessel.

Figure 5:
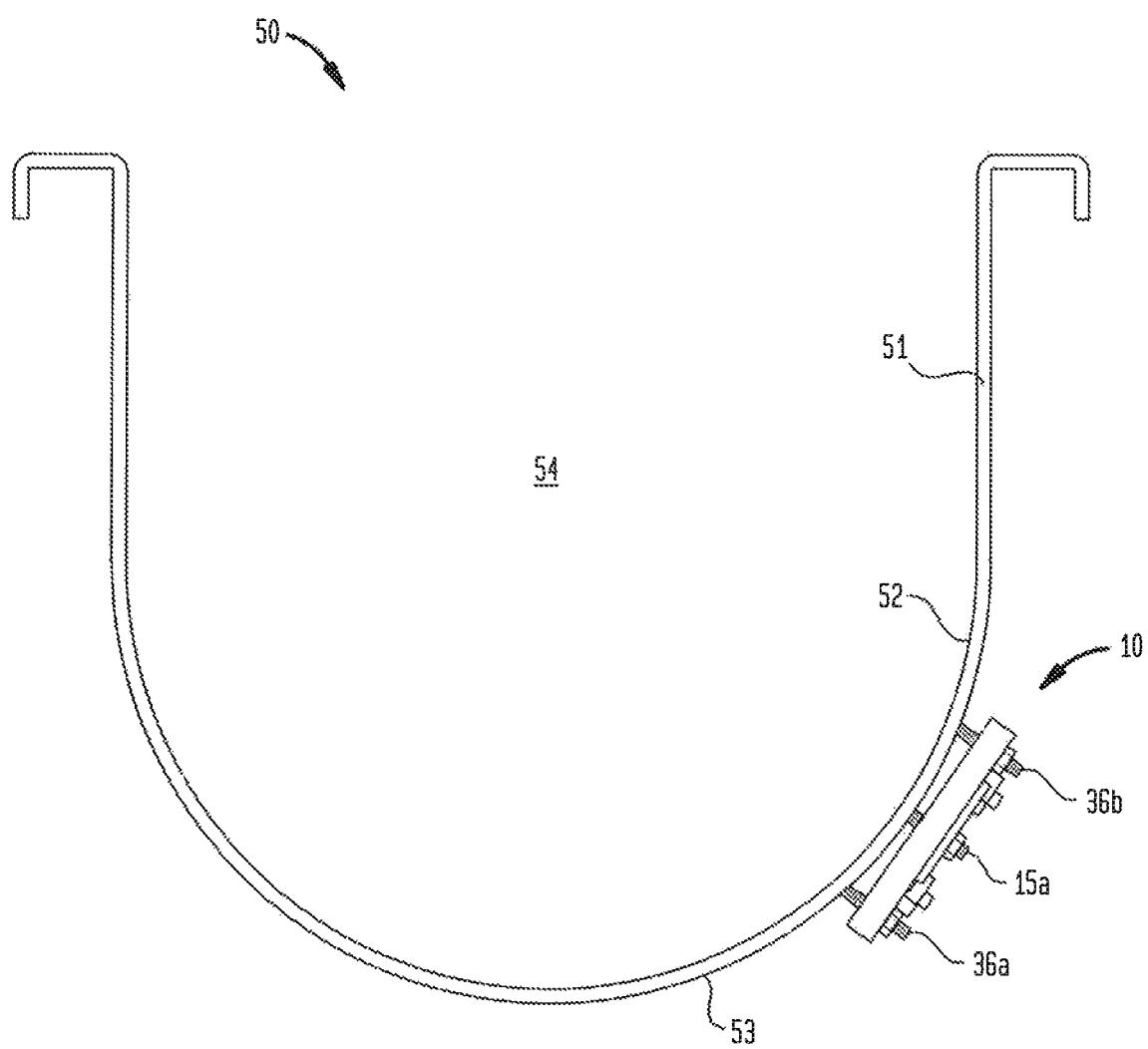
FIG. 5 is an end view in cross-section of a cryogenic processing vessel with the cryogen injector mounting apparatus attached to an exterior wall surface of a cryogenic processing vessel.

Referring to FIG. 5, an end view is shown of a cryogenic processing vessel 50 with the cryogen injector mounting apparatus 10 attached to an exterior side wall surface. Cryogenic processing vessel 50 includes a side wall 51. Side wall 51 of vessel 50 includes opposite facing interior 52 and exterior 53 side wall surfaces. The side wall 51 of the vessel 50 defines an interior 54 into which a cryogenic substance is injected to treat a material or product that is located within the interior 54 of the vessel 50. Mounting apparatus 10 is temporarily attached to the exterior side wall surface 53 of the vessel 50 and jacking bolts 36a, 36b are used to aligned to the bottom surface of the mounting apparatus 10 relative to the exterior side wall surface 53 of the vessel 50.

Figure 6:
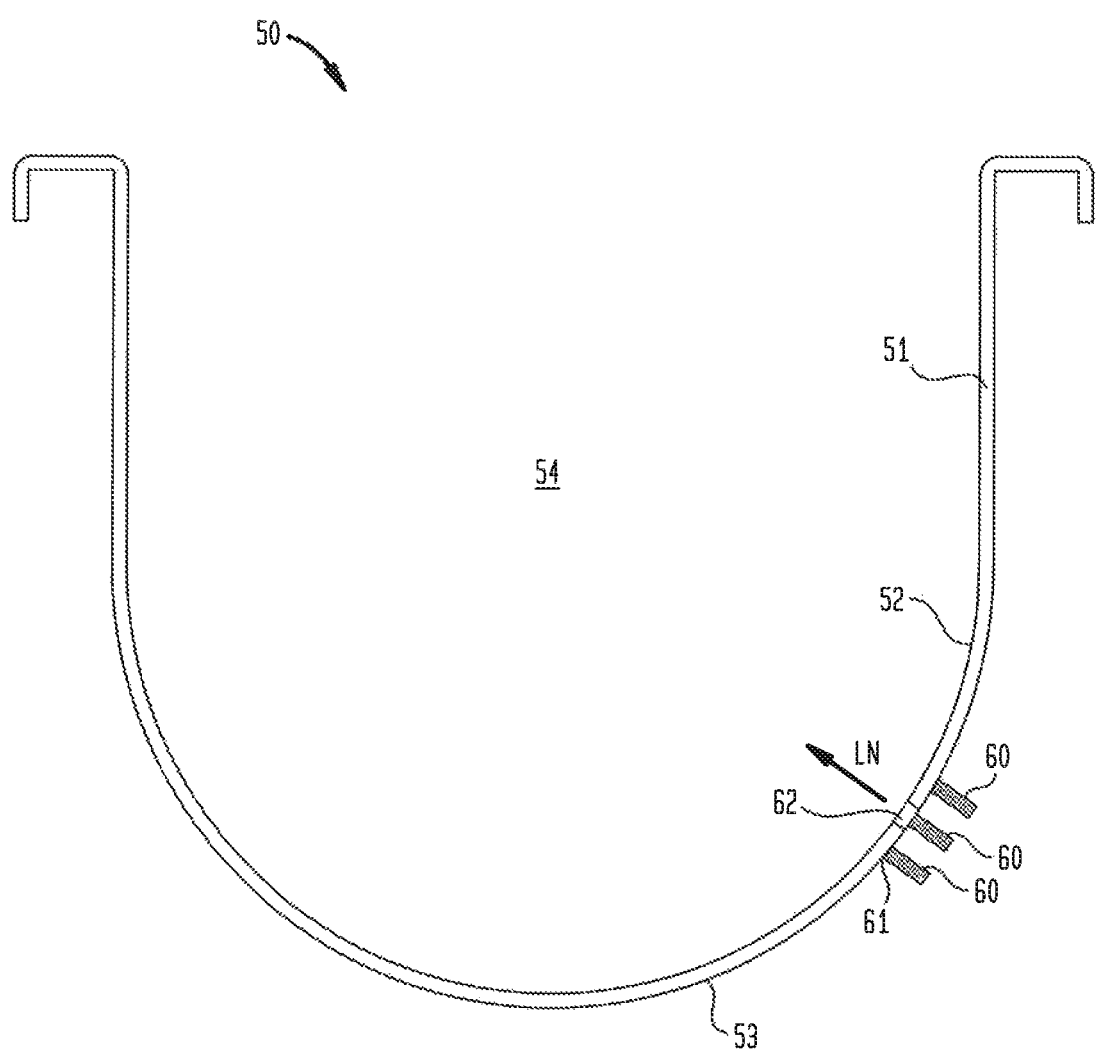
FIG. 6 is an end view in cross-section of a cryogenic processing vessel with the cryogen injector after the mounting apparatus is removed from an exterior wall surface of a cryogenic processing vessel.

Referring to FIG. 6, an end view is shown of the cryogenic processing vessel 50 after the mounting apparatus 10 is removed from an exterior wall surface of the vessel 50. According to the method of mounting the cryogen injector nozzle to the cryogenic processing vessel, the mounting apparatus was removably attached to the exterior side wall surface 52 of the vessel 50. An opening 62 in the side wall 51 was created by boring or drilling through the side wall 51 of the vessel 50 by operating a drilling bit through drill bushing 40 that was inserted into the aligned first insert member opening 24 and base member opening 14. A plurality of elongated threaded fasteners 60 were attached to the exterior surface 53 of the side wall 51 of the vessel 50 by passing the fasteners 60 through the second insert member openings 25a-25f in insert member 20 and attaching ends of the fasteners 60 to the wall surface 53 with welds 61. After removal of the mounting apparatus 10, opening 62 in vessel side wall 51 is surrounded by a plurality of elongated fasteners 60 extending outwardly from the exterior wall surface 53 along their respective longitudinal axes.

Figure 7:
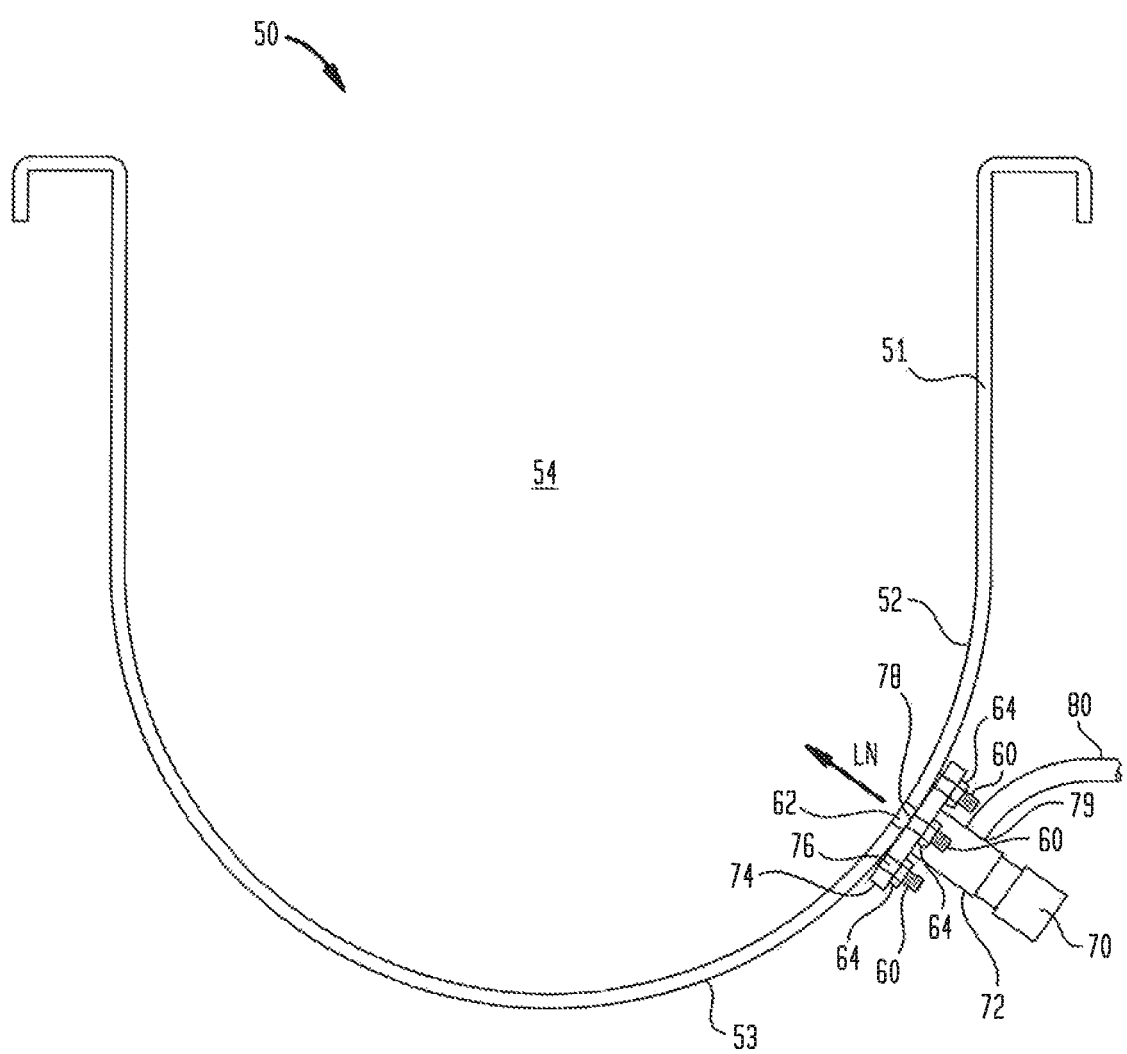
FIG. 7 is an end view in cross-section of a cryogenic treatment vessel showing the cryogen injector nozzle mounted on the exterior wall surface of the vessel.

Referring to FIG. 7 an end view of a cryogenic processing vessel 50 with the cryogen injector 70 mounted to an exterior side wall surface 53 of the cryogenic processing vessel 50 is shown. Cryogenic processing vessel 50 includes a side wall 51. Side wall 51 of vessel 50 includes opposite facing interior 52 and exterior 53 side wall surfaces. Nozzle apparatus 70 includes chamber 72 and mounting plate 74. Apparatus 70 includes a flexible hose 80 connecting an inlet 79 of the nozzle apparatus 70 to a source of cryogenic substance (not shown in FIG. 7). Mounting plate 74 of apparatus 70 includes a plurality of openings 76 configured to receive fasteners 60 which are secured with mechanical fasteners such as for example threaded nuts 64. The cryogen injector nozzle apparatus 70 is attached to the exterior side wall surface 53 of the vessel 50 with the mechanical fasteners 60 and nuts 64. Outlet 78 of nozzle 70 is positioned over opening 62 formed in side wall 51 of vessel 50 and secured in place by tightening nuts 64 on fasteners 60.

Illustrative embodiments of the cryogen injection nozzle mounting apparatus and mounting method include:

In a first embodiment, provided is an apparatus for mounting a cryogen injection nozzle to a side wall of a cryogenic processing vessel, the apparatus comprising a base member having opposite facing first and second base member sides and a base member opening extending through the base member, and an insert member rotatably positioned within the opening of the base member, the insert member comprising first and second insert member sides, a first insert opening extending through the insert member, and a plurality of second insert openings positioned around the first insert opening and extending through the insert member.

According to a second embodiment, provided is an apparatus for mounting a cryogen injection nozzle to a side wall of a processing vessel of embodiment 1, wherein the base member of the apparatus is planar.

According to third embodiment, provided is an apparatus for mounting a cryogen injection nozzle to a side wall of a processing vessel of either embodiment 1 or embodiment 2, wherein the shape of the planar base member is an octagon.

According to a fourth embodiment, provided is an apparatus for mounting a cryogen injection nozzle to a side wall of a processing vessel of either embodiment 1 or any subsequent embodiments, wherein the base member further comprises a pair of openings positioned on opposite ends of the base member along an axis that bisects the base member opening, and which are configured to accept sacrificial mechanical fasteners for removably attaching the apparatus to the exterior surface of the side wall of the cryogen processing vessel.

According to a fifth embodiment, provided is an apparatus for mounting a cryogen injection nozzle to a side wall of a processing vessel of either embodiment 1 or any subsequent embodiments, wherein the insert member includes a lower portion have a first outer diameter and an upper lip portion having a second outer diameter, wherein the second outer diameter is greater than the first outer diameter.

According to a sixth embodiment, provided is an apparatus for mounting a cryogen injection nozzle to a side wall of a processing vessel of embodiment 5, wherein the upper lip portion of the insert member rests in adjacent contact on the first surface of the base member, and the lower portion of the insert member extends into the base member opening.

According to a seventh embodiment, provided is an apparatus for mounting a cryogen injection nozzle to a side wall of a processing vessel of either embodiment 1 or any subsequent embodiments, wherein the insert member comprises the first insert opening extending through the insert member, and the plurality of second insert openings are positioned concentrically around the first insert opening and extending through the insert member.

According to an eighth embodiment, provided is an apparatus for mounting a cryogen injection nozzle to a side wall of a processing vessel of embodiment 7 or any subsequent embodiments, wherein the plurality of second insert openings are equidistantly spaced in a concentric pattern around the first insert member opening, and wherein the center of each of the plurality of second insert member openings is equidistant from the center of the first insert member opening.

According to a ninth embodiment, provided is an apparatus for mounting a cryogen injection nozzle to a side wall of a processing vessel of either embodiment 1 or any subsequent embodiment, further comprising a drill bushing at least partially positioned in the first insert opening of the insert member.

According to a tenth embodiment, provided is an apparatus for mounting a cryogen injection nozzle to a side wall of a processing vessel of embodiment 9, wherein an inner diameter of the drill bushing is 12 mm.

According to an eleventh embodiment, provided is an apparatus for mounting a cryogen injection nozzle to a side wall of a processing vessel of embodiment 1 or any subsequent embodiments, wherein the apparatus further comprises means for constraining the rotation of the insert member.

According to a twelfth embodiment, provided is an apparatus for mounting a cryogen injection nozzle to a side wall of a processing vessel of embodiment 11, wherein the means for constraining comprises at least one mechanical fastener mounted on the first side of the base member.

According to a thirteenth embodiment, provided is an apparatus for mounting a cryogen injection nozzle to a side wall of a processing vessel of embodiment 11, wherein the means for constraining comprises two fasteners mounted on the first side of the base member and aligned along an axis that bisects the insert member.

According to a fourteenth embodiment, provided is an apparatus for mounting a cryogen injection nozzle to a side wall of a processing vessel of embodiment 1 or any subsequent embodiments, further comprising at least one jacking bolt or jacking screw in threaded engagement with the base member of the apparatus.

According to a fifteenth embodiment, provided is an apparatus for mounting a cryogen injection nozzle to a side wall of a processing vessel of embodiment 14, further comprising pairs of spaced-apart jacking bolts or jacking screws in threaded engagement with the base member of the apparatus, wherein the pairs of jacking bolts or jacking screws are positioned along imaginary axes near opposite sides of the base member.

According to a sixteenth embodiment, provided is an apparatus for mounting a cryogen injection nozzle to a side wall of a processing vessel of embodiment 1, wherein the processing vessel is a vessel selected from the group consisting of cryogenic blenders, cryogenic tumblers, cryogenic mixers, cryogenic kettles, cryogenic chillers, cryogenic coolers, and cryogenic freezers used with food products and beverages.

According to a seventeenth embodiment, provided is a method for mounting a cryogen injection nozzle to the side wall of a cryogenic processing vessel comprising:
(a) removably attaching an apparatus for mounting the cryogen injection nozzle to the side wall of the vessel, the apparatus comprising:
  a base member having opposite facing first and second base member sides and a base member opening extending through the base member, and
  an insert member rotatably positioned within the opening of the base member, the insert member comprising first and second insert member sides, a first insert opening extending through the insert member, and a plurality of second insert openings positioned around the first insert opening and extending through the insert member;
(b) creating an opening in the side wall of the vessel by passing an opening-forming means through the first insert opening of the insert member of the apparatus and the side wall of the cryogenic processing vessel;
(c) attaching mechanical fasteners to the exterior surface of the side wall of the cryogen processing vessel in a pattern around the opening formed in the side wall by passing a mechanical fastener through each of the second insert openings of the insert member of the mounting apparatus;
(d) removing the mounting apparatus from the side wall of the cryogenic processing vessel; and
(e) attaching the cryogen injection nozzle to the exterior surface of the side wall of the cryogenic processing vessel.

According to an eighteenth embodiment, provided is a method for mounting a cryogen injection nozzle to the side wall of a cryogenic processing vessel of embodiment 17, wherein the step of attaching the cryogen injection nozzle to the side wall of the cryogenic processing vessel comprises passing the mechanical fasteners through corresponding openings on the cryogen injection nozzle and fastening the cryogen injection nozzle to the exterior surface of the vessel.

According to a nineteenth embodiment, provided is a method for mounting a cryogen injection nozzle to the side wall of a cryogenic processing vessel of embodiment 17 or embodiment 18, further comprising connecting the cryogen injection nozzle to a source of fluid cryogen.

According to a twentieth embodiment, provided is a method for mounting a cryogen injection nozzle to the side wall of a cryogenic processing vessel of embodiment 17 or any subsequent embodiments, wherein the fluid cryogen is selected from the group consisting of liquid carbon dioxide and liquid nitrogen.

According to a twenty-first embodiment, provided is a method for mounting a cryogen injection nozzle to the side wall of a cryogenic processing vessel of embodiment 17 or any subsequent embodiments, wherein the fluid cryogen is liquid nitrogen.

According to a twenty-second embodiment, provided is a method for mounting a cryogen injection nozzle to the side wall of a cryogenic processing vessel of embodiment 17 or any subsequent embodiments, wherein the vessel is a vessel selected from the group consisting of cryogenic blenders, cryogenic tumblers, cryogenic mixers, cryogenic kettles, cryogenic chillers, cryogenic coolers, and cryogenic freezers used with food products and beverages.

According to a twenty-third embodiment, provided is a mounting apparatus for mounting a cryogen injection nozzle to the exterior surface of a side wall of a cryogenic processing or treatment vessel of any one of first to sixteenth embodiments above.

According to a twenty-fourth embodiment, provided is a use of the mounting apparatus of any one of the first to sixteenth embodiments above for mounting a cryogen injection nozzle to the exterior surface of a side wall of a cryogenic processing or treatment vessel.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:
1. An apparatus for mounting a cryogen injection nozzle to a side wall of a cryogenic processing vessel, the apparatus comprising:

a base member having opposite facing first and second base member sides, and a base member opening extending through the base member; and an insert member rotatably positioned within the opening of the base member, the insert member comprising first and second insert member sides, a first insert opening extending through the insert member, and a plurality of second insert openings positioned around the first insert opening and extending through the insert member.

2. The apparatus for mounting the cryogen injection nozzle to a side wall of a processing vessel of claim 1, wherein the base member of the apparatus is planar.

3. The apparatus for mounting the cryogen injection nozzle to the side wall of the processing vessel of claim 2, wherein the shape of the planar base member is an octagon.

4. The apparatus for mounting the cryogen injection nozzle to a side wall of a processing vessel of claim 1, wherein the base member further comprises a pair of openings positioned on opposite ends of the base member along an axis that bisects the base member opening, and which are configured to accept sacrificial mechanical fasteners for removably attaching the apparatus to the exterior surface of the side wall of the cryogen processing vessel.

5. The apparatus for mounting the cryogen injection nozzle to a side wall of a processing vessel of claim 1, wherein the insert member includes a lower portion have a first outer diameter and an upper lip portion having a second outer diameter, wherein the second outer diameter is greater than the first outer diameter.

6. The apparatus for mounting the cryogen injection nozzle to the side wall of the processing vessel of claim 5, wherein the upper lip portion of the insert member rests in adjacent contact on the first surface of the base member, and the lower portion of the insert member extends into the base member opening.

7. The apparatus for mounting the cryogen injection nozzle to a side wall of a processing vessel of claim 1, wherein the insert member comprises the first insert opening extending through the insert member, and the plurality of second insert openings are positioned concentrically around the first insert opening and extending through the insert member.

8. The apparatus for mounting the cryogen injection nozzle to the side wall of the processing vessel of claim 7, wherein the plurality of second insert openings are equidistantly spaced in a concentric pattern around the first insert member opening, and wherein the center of each of the plurality of second insert openings is equidistant from the center of the first insert member opening.

9. The apparatus for mounting the cryogen injection nozzle to a side wall of a processing vessel of claim 1, further comprising a drill bushing at least partially positioned in the first insert opening of the insert member.

10. The apparatus for mounting the cryogen injection nozzle to the side wall of the processing vessel of claim 9, wherein an inner diameter of the drill bushing is 12 mm.

11. The apparatus for mounting the cryogen injection nozzle to a side wall of a processing vessel of claim 1, wherein the apparatus further comprises means for constraining the rotation of the insert member.

12. The apparatus for mounting the cryogen injection nozzle to the side wall of the processing vessel of claim 11, wherein the means for constraining comprises at least one mechanical fastener mounted on the first side of the base member.

13. The apparatus for mounting the cryogen injection nozzle to the side wall of the processing vessel of claim 11, wherein the means for constraining comprises two fasteners mounted on the first side of the base member and aligned along an axis that bisects the insert member.

14. The apparatus for mounting the cryogen injection nozzle to the side wall of the processing vessel of claim 1, further comprising at least one jacking bolt or jacking screw in threaded engagement with the base member of the apparatus.

15. The apparatus for mounting the cryogen injection nozzle to a side wall of a processing vessel of claim 14, further comprising pairs of spaced-apart jacking bolts or jacking screws in threaded engagement with the base member of the apparatus, wherein the pairs of jacking bolts or jacking screws are positioned along axes near opposite sides of the base member.

16. The apparatus for mounting the cryogen injection nozzle to a side wall of a processing vessel of claim 1, wherein the processing vessel is a vessel selected from the group consisting of cryogenic blenders, cryogenic tumblers, cryogenic mixers, cryogenic kettles, cryogenic chillers, cryogenic coolers, and cryogenic freezers used with food products and beverages.

17. A method for mounting a cryogen injection nozzle to a side wall of a cryogenic processing vessel comprising: (a) removably attaching an apparatus for mounting the cryogen injection nozzle to the side wall of the vessel, the apparatus comprising: a base member having opposite facing first and second base member sides and a base member opening extending through the base member, and an insert member rotatably positioned within the opening of the base member, the insert member comprising first and second insert member sides, a first insert opening extending through the insert member, and a plurality of second insert openings positioned around the first insert opening and extending through the insert member; (b) creating an opening in the side wall of the vessel by passing an opening-forming means through the first insert opening of the insert member of the apparatus and the side wall of the cryogenic processing vessel; (c) attaching mechanical fasteners to the exterior surface of the side wall of the cryogen processing vessel in a concentric pattern around the opening formed in the side wall by passing a mechanical fastener through each of the second insert openings of the insert member of the mounting apparatus; (d) removing the mounting apparatus from the side wall of the cryogenic processing vessel; and (e) attaching the cryogen injection nozzle to the exterior surface of the side wall of the cryogenic processing vessel.

18. The method for mounting the cryogen injection nozzle to the side wall of the cryogenic processing vessel of claim 17, wherein the step of attaching the cryogen injection nozzle to the side wall of the cryogenic processing vessel comprises passing the mechanical fasteners through corresponding openings on the cryogen injection nozzle and fastening the cryogen injection nozzle to the exterior surface of the vessel.

19. The method for mounting the cryogen injection nozzle to the side wall of the cryogenic processing vessel of claim 18, further comprising connecting the cryogen injection nozzle to a source of fluid cryogen.

20. The method for mounting the cryogen injection nozzle to the side wall of the cryogenic processing vessel of claim 19, wherein the fluid cryogen is selected from the group consisting of liquid carbon dioxide and liquid nitrogen.

21. The method for mounting the cryogen injection nozzle to the side wall of the cryogenic processing vessel of claim 19, wherein the fluid cryogen is liquid nitrogen.

22. The method for mounting the cryogen injection nozzle to the side wall of the cryogenic processing vessel of claim 17, wherein the vessel is a vessel selected from the group consisting of cryogenic blenders, cryogenic tumblers, cryogenic mixers, cryogenic kettles, cryogenic chillers, cryogenic coolers, and cryogenic freezers used with food products and beverages.

* * * * *